United States Patent
Al Ramady et al.

(10) Patent No.: US 10,862,781 B2
(45) Date of Patent: Dec. 8, 2020

(54) IDENTIFYING NETWORK ISSUES USING AN AGENTLESS PROBE AND END-POINT NETWORK LOCATIONS

(71) Applicant: Saudi Arabian Oil Company, Dhahran (SA)

(72) Inventors: Baher Y. Al Ramady, Damman (SA); Marek Zidek, Dhahran (SA); Mawada M. Felemban, Dhahran (SA); Mohammad K. AlMunea, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 36 days.

(21) Appl. No.: 16/182,935

(22) Filed: Nov. 7, 2018

(65) Prior Publication Data

US 2020/0145308 A1    May 7, 2020

(51) Int. Cl.
*H04L 12/26* (2006.01)
*H04L 29/08* (2006.01)

(52) U.S. Cl.
CPC .............. *H04L 43/08* (2013.01); *H04L 67/10* (2013.01)

(58) Field of Classification Search
CPC ................................ H04L 43/08; H04L 67/10
See application file for complete search history.

(56) References Cited

U.S. PATENT DOCUMENTS

| 5,864,662 A | 1/1999 | Brownmiller et al. |
| 6,072,777 A | 6/2000 | Bencheck et al. |
| 7,237,138 B2 | 6/2007 | Greenwald et al. |
| 7,428,300 B1 | 9/2008 | Drew |

(Continued)

FOREIGN PATENT DOCUMENTS

| EP | 3211831 | 8/2017 | |
| GB | 2481422 A | * 12/2011 | ........... G06F 1/3203 |
| WO | WO2017072614 | 5/2017 | |

OTHER PUBLICATIONS

PCT International Search Report and Written Opinion in International Appln. PCT/US2019/061441, dated Feb. 4, 2020, 14 pages.

(Continued)

*Primary Examiner* — Kostas J Katsikis
(74) *Attorney, Agent, or Firm* — Fish & Richardson P.C.

(57) ABSTRACT

Methods, systems, and apparatus, including computer programs encoded on a computer storage medium, for improving the connectivity and response speed throughout a network. In one aspect, a method includes receiving network traffic data from an aggregation point on a network, the network traffic data having been sent to or received from one of a plurality of end-point devices on the network, calculating performance metrics for each of the end-point devices based the received network traffic data, for each of the end-point devices, comparing the performance metrics to respective threshold values to determine performance issues for the network, wherein the threshold values are determined based on historical network data, correlating the determined performance issues for the network to an aspect of the end-point devices, and implementing an action to correct the determined performance issues for the network based on the aspect of the at least one end-point devices.

19 Claims, 6 Drawing Sheets

(56) References Cited

U.S. PATENT DOCUMENTS

| | | | |
|---|---|---|---|
| 7,600,007 B1 | 10/2009 | Lewis | |
| 8,782,225 B2 | 7/2014 | Bali | |
| 9,432,865 B1* | 8/2016 | Jadunandan | H04L 41/069 |
| 9,491,764 B1* | 11/2016 | Ross | H04W 16/28 |
| 9,729,414 B1* | 8/2017 | Oliveira | H04L 41/042 |
| 10,045,252 B2* | 8/2018 | Agarwal | H04L 47/11 |
| 10,116,539 B1* | 10/2018 | Fuchs | H04L 43/0811 |
| 10,191,778 B1* | 1/2019 | Yang | G06Q 30/0283 |
| 10,313,213 B1* | 6/2019 | Aygun | H04L 43/50 |
| 10,567,243 B2* | 2/2020 | Tippenhauer | H04L 43/045 |
| 10,601,684 B2* | 3/2020 | Hashmi | G06T 17/05 |
| 10,644,979 B2* | 5/2020 | Samadi | H04L 43/045 |
| 10,680,889 B2* | 6/2020 | Vasseur | G06N 20/20 |
| 2001/0039577 A1 | 11/2001 | Barkai et al. | |
| 2003/0126254 A1 | 7/2003 | Cruickshank, III et al. | |
| 2003/0145081 A1 | 7/2003 | Lau | |
| 2003/0225549 A1* | 12/2003 | Shay | H04L 43/12 702/182 |
| 2004/0064760 A1* | 4/2004 | Hicks | H04M 3/2227 714/43 |
| 2004/0103181 A1 | 5/2004 | Chambliss | |
| 2006/0056389 A1 | 3/2006 | Monk | |
| 2006/0182034 A1 | 8/2006 | Klinker et al. | |
| 2006/0215564 A1 | 9/2006 | Breitgand et al. | |
| 2006/0221876 A1 | 10/2006 | Kosanovic et al. | |
| 2006/0276995 A1* | 12/2006 | Breitgand | H04L 41/00 702/179 |
| 2006/0293777 A1* | 12/2006 | Breitgand | H04L 43/16 700/108 |
| 2008/0016412 A1* | 1/2008 | White | H04L 43/08 714/48 |
| 2008/0027961 A1* | 1/2008 | Arlitt | H04L 43/08 |
| 2008/0049753 A1 | 2/2008 | Heinze et al. | |
| 2009/0059895 A1 | 3/2009 | Yasrebi | |
| 2009/0089438 A1* | 4/2009 | Agarwal | H04L 29/12066 709/228 |
| 2010/0088410 A1* | 4/2010 | Ridley | H04L 41/0896 709/224 |
| 2010/0103822 A1 | 4/2010 | Montwill | |
| 2010/0211673 A1 | 8/2010 | Kosbab et al. | |
| 2011/0129071 A1* | 6/2011 | Blackburn | H04M 3/306 379/1.04 |
| 2011/0295942 A1* | 12/2011 | Raghunath | H04L 45/04 709/203 |
| 2012/0163386 A1* | 6/2012 | Wang | H04L 61/15 370/392 |
| 2013/0021933 A1* | 1/2013 | Kovvali | H04W 88/18 370/252 |
| 2013/0107715 A1* | 5/2013 | Szabo | H04L 45/46 370/235 |
| 2013/0242775 A1 | 9/2013 | Taylor | |
| 2013/0304842 A1* | 11/2013 | Zachariassen | G06F 16/172 709/213 |
| 2014/0189097 A1 | 7/2014 | Sidi | |
| 2014/0192668 A1* | 7/2014 | Yamany | H04L 41/5035 370/252 |
| 2015/0089054 A1* | 3/2015 | Rizzi | H04L 41/22 709/224 |
| 2015/0128056 A1* | 5/2015 | Rizzi | H04L 41/22 715/736 |
| 2015/0138989 A1 | 5/2015 | Polehn | |
| 2015/0149631 A1* | 5/2015 | Lissack | H04L 43/16 709/226 |
| 2016/0155076 A1* | 6/2016 | Fix | G06Q 10/06395 705/7.39 |
| 2016/0162346 A1 | 6/2016 | Kushnir et al. | |
| 2016/0360361 A1* | 12/2016 | Ross | H04W 24/08 |
| 2017/0046243 A1 | 2/2017 | Shinde | |
| 2017/0111807 A1* | 4/2017 | Townend | H04L 43/16 |
| 2017/0126475 A1 | 5/2017 | Mahkonen et al. | |
| 2017/0237851 A1 | 8/2017 | Hassan et al. | |
| 2017/0279703 A1* | 9/2017 | Wasmundt | H04L 43/08 |
| 2017/0302505 A1* | 10/2017 | Zafer | H04L 69/40 |
| 2017/0302553 A1* | 10/2017 | Zafer | H04W 28/0236 |
| 2017/0359272 A1* | 12/2017 | Srinivasan | H04L 43/0876 |
| 2018/0024867 A1* | 1/2018 | Gilsdorf | H04Q 1/09 709/226 |
| 2018/0054772 A1* | 2/2018 | Tan | H04L 45/24 |
| 2018/0109564 A1 | 4/2018 | Rahman | |
| 2018/0167446 A1* | 6/2018 | Lewis | G06Q 10/06 |
| 2018/0176095 A1* | 6/2018 | Diwakar | H04L 41/5009 |
| 2018/0262414 A1 | 9/2018 | Burbridge | |
| 2018/0270126 A1 | 9/2018 | Tapia | |
| 2018/0343192 A1* | 11/2018 | Antonyraj | H04L 43/16 |
| 2019/0036772 A1* | 1/2019 | Agerstam | H04W 24/10 |
| 2019/0052518 A1* | 2/2019 | Gal | H04L 41/5009 |
| 2019/0082286 A1* | 3/2019 | Tata | H04W 4/38 |
| 2019/0141113 A1* | 5/2019 | Ganapathi | G06N 5/003 |
| 2019/0141543 A1* | 5/2019 | Ganapathi | H04W 24/02 |
| 2019/0200243 A1* | 6/2019 | Anand | H04L 12/1435 |
| 2019/0205153 A1* | 7/2019 | Niestemski | H04L 41/0686 |
| 2019/0213514 A1* | 7/2019 | Gonzalez | G06Q 10/06315 |
| 2019/0280950 A1* | 9/2019 | Alshafei | H04L 43/16 |
| 2019/0319868 A1* | 10/2019 | Svennebring | H04L 41/147 |
| 2019/0363960 A1* | 11/2019 | Fuchs | H04L 43/10 |
| 2020/0028782 A1* | 1/2020 | Li | H04L 47/12 |
| 2020/0029240 A1* | 1/2020 | Li | |

OTHER PUBLICATIONS

PCT International Search Report and Written Opinion in International Appln. PCT/US2019/061443, dated Feb. 12, 2020, 14 pages.
PCT International Search Report and Written Opinion in International Appln. PCT/US2019/059843, dated Apr. 14, 2020, 14 pages.

* cited by examiner

IDENTIFYING NETWORK ISSUES USING AN AGENTLESS PROBE AND END-POINT NETWORK LOCATIONS

TECHNICAL FIELD

This disclosure relates to methods, systems, and apparatus for improving the connectivity and response speed throughout a network.

BACKGROUND

A computer network includes two or more connected machines, such as a computer. This connection included both a physical aspect and a logical aspect. The physical aspect includes physical media, such as wires and cables as well as wireless media while the logical aspect includes the transport of data across the physical aspect. Machines connected to a network typically use procedures for sending and receiving data, which are known as communications protocols. The architecture of a network includes the combination of these physical and logical components. Such a network architecture dictates the physical topology and the logical arrangements of these components to provide, for example, an efficient system for data transport and storage.

SUMMARY

The present disclosure describes methods and systems, including computer-implemented methods, computer-program products, and computer systems for improving network performance by determining causes and locations of network degradation In a general implementation, a computer-implemented method executed by one or more processors includes receiving network traffic data from an aggregation point on a network. The network traffic data having been sent to or received from one of a plurality of end-point devices on the network. Performance metrics for each of the end-point devices are calculated based the received network traffic data. For each of the end-point devices, the performance metrics are compared to respective threshold values to determine performance issues for the network. The threshold values are determined based on historical network data collected for the respective end-point device. The determined performance issues for the network are correlated to an aspect of at least one of the end-point devices. An action to correct the determined performance issues is implemented for the network based on the aspect of the at least one end-point devices.

The described network degradation analysis system can be implemented to identify a portion of a network, whether physical or logical, where performance degradation is affecting the data traffic. In some implementations, the described network degradation analysis system may be employed to identify the location where there is a performance degradation without the need of correlating health statistics, which can be overhead to a monitoring entity. The described system reduces cost by providing for a minimum number of agentless probes distributed throughout a network. Moreover, real-time identification of a degraded device or network can be provided using a minimum set of data as input.

The details of one or more implementations of the subject matter of this specification are set forth in the accompanying drawings and the later description. Other features, aspects, and advantages of the subject matter will become apparent from the description, the drawings, and the claims.

DETAILED DESCRIPTION

This disclosure generally describes system for to determine a root cause(s) of network degradation and identify that end-point(s) of a network are causing issues. The disclosure is presented to enable any person skilled in the art to make and use the disclosed subject matter in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described or illustrated implementations, but is to be accorded the widest scope consistent with the principles and features disclosed herein.

Network degradation includes a decrease in connectivity and response speed throughout a network. Causes of network degradation can include malware or spyware as well as propagation delays. Propagation delays involve, for example, problems with routing and transporting data across an information technology (IT) architecture. Aspects of systems that modify or work on data can also cause network degradation. Other causes can include end-point problems, where terminals or workstations that are acting as data destinations experience delays because of, for example, insufficient memory or processing capacity. These types of network problems, such as with individual hardware devices, may depress functionality in a particular section(s) of a network or cause issues that are network wide. For example, problems with fragmentation of data packets can affect the performance of an entire network.

To identify and handle these various causes and the resulting network degradation, various tests and analysis can be performed on the network as well as the routing of data packets through the network. Network degradation analysis may include an extraction and diagnosis of the impact of various attacks on the network, such as a denial of service (DoS) attack. This analysis and resulting diagnosis of network degradation improves network functionality and helps to maintain data structures or other network-supported models.

In view of the forgoing, the described network degradation analysis system can be employed to determine a root cause(s) of network degradation and identify which endpoint(s) of the network are causing issues. Such end-points can include any machine, physical or virtual, that is connected to the network and assigned at least an Internet Protocol (IP) address. The assigned IP address can be employed by the respective machine to connect to, for example, hosted services. In some implementations, the described system employs at least one agentless probe located at strategic location of the network where the traffic of most endpoints can be captured and calculated. Moreover, the grouping is done based on rules coming from the endpoints location. The combination of the two set of data make it different than other prior art.

The described network degradation analysis system may conduct a root cause analysis of network degradation by identifying the portion(s) of a data network that are experiencing issues by using, for example, end-points switch or ports locations and end-points network response times. In some implementations, an agentless probe can be employed to actively collect network performance metrics from end-points' traffic passing through, for example, a network aggregation point. Such network aggregation points may include, for example, a data center boundary or a proxy. The collected network performance data can be correlated with switch location information to determine, for example, the nearest physical or virtual point of the data network to the end-point causing the issue.

The described network degradation analysis system may rely on both the location of end-points in the network and performance metric for each end-point. The location of end-points may include the access point, such as a switch or port, through which the end-point is connected to the network. Location information can be taken from a switch media access control (MAC)-address table and correlated through an address resolution protocol (ARP) table of a gateway through the MAC address. Additional, properties can be pulled, such as virtual local area network (VLAN) to enrich the ARP table. Table 1 provides an example of such an ARP table:

TABLE 1

| Device# | L2 Address | Switch | Property (VLAN or others) | Switch Port | Gateway | Gateway Interface | L3 Address |
|---|---|---|---|---|---|---|---|
| 1 | MAC1 | S1 | V1 | P1 | G1 | I1 | IP1 |
| 2 | MAC2 | S1 | V2 | P2 | G1 | I1 | IP2 |
| 3 | MAC3 | S2 | V1 | P5 | G2 | I1 | IP3 |
| 4 | MAC4 | S3 | V3 | P7 | G2 | I2 | IP4 |

Performance metrics may be related to an assigned address for an end-points. These performance metrics may be observed and calculated from an agentless monitor. In some implementations, such agentless monitors are located at strategic aggregation points of a corresponding network. A strategic aggregation points includes areas where traffic of the end-points pass through, such as data center boundaries, proxies, and IT service providers.

In some implementations, performance metrics can be actively calculated using, for example, a sniffer or performance collector. In such implementations, the agentless monitor mirrors or taps traffic by employing the sniffer or performance collector such that metadata is extracted and performance metrics are calculated per end-point. In some implementations, this data is calculated and stored periodically.

Examples of the performance metrics include, but are not limited to response time, utilization, and errors. Response time can include, for example, client network time and client application dely. Utilization can include, for example, packets per second and bits per second. Error can include, for example, retransmission and zero windows. Performance metrics can also be protocol specific such as: unified communications (UC) Jitter, Mean Opinion Score (MOS), call setup duration, uniform resource locator (URL) hits, URL response, email response errors, and so forth.

Table 2 provides an example of collected performance metrics.

TABLE 2

| End-Point Address | Collection Timeframe | Metric1 Value | Matric2 Value | MetricN Value |
|---|---|---|---|---|
| IP1 | T1-T2 | IP1_T1_M1 | IP1_T1_M2 | . . . |
| IP2 | T1-T2 | IP2_T1_M1 | IP2_T1_M2 | . . . |
| IP3 | T1-T2 | IP3_T1_M1 | IP3_T1_M2 | . . . |
| IP4 | T1-T2 | IP4_T1_M1 | IP4_T1_M2 | . . . |
| IP1 | T2-T3 | IP1_T2_M1 | IP1_T2_M2 | . . . |
| IP2 | T2-T3 | IP2_T2_M1 | IP2_T2_M2 | . . . |
| IP3 | T2-T3 | IP3_T2_M1 | IP3_T2_M2 | . . . |
| IP4 | T2-T3 | IP4_T2_M1 | IP4_T2_M2 | . . . |

Figure 1A:
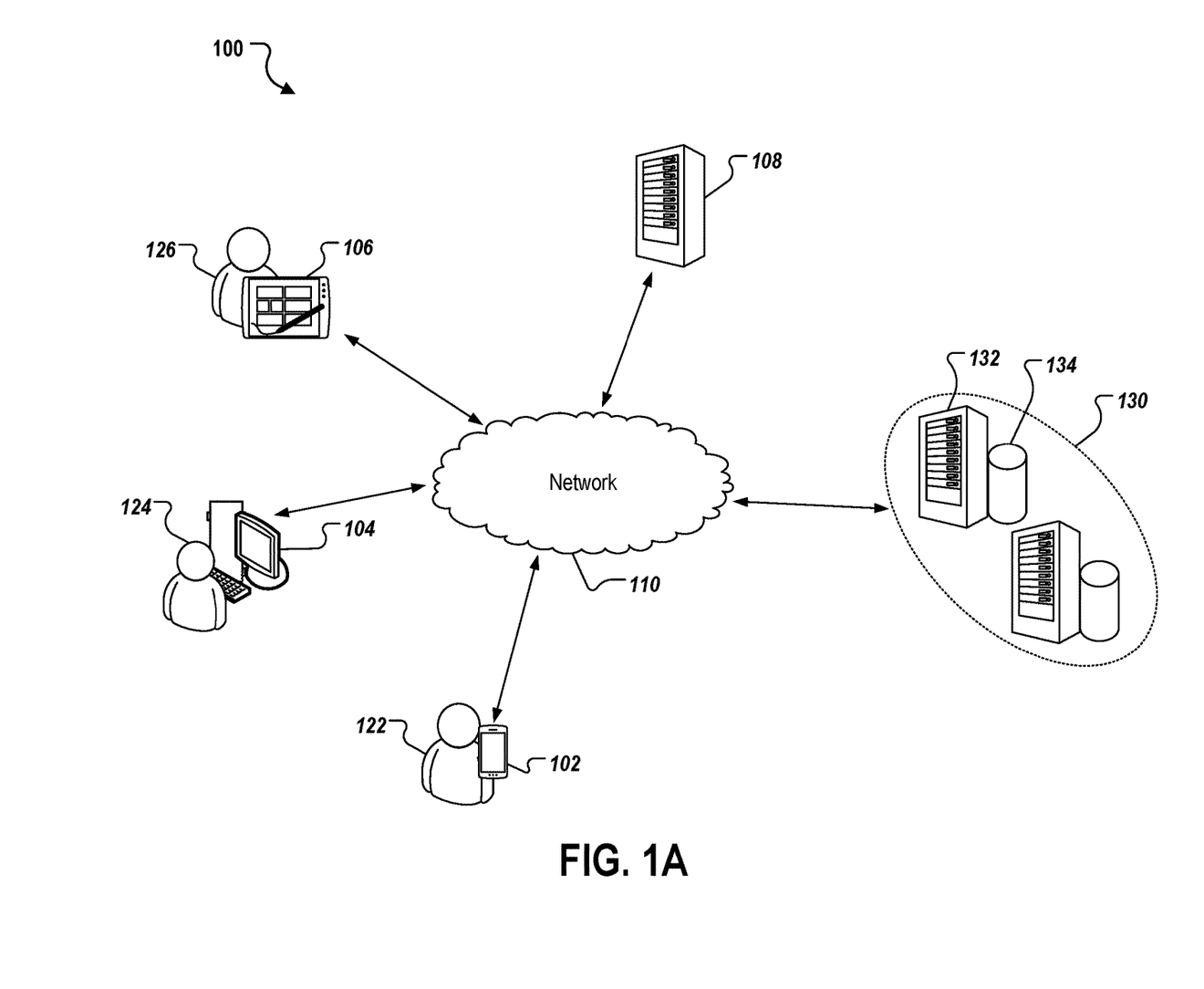
FIGS. 1A and 1B depict example environments that can be employed to execute implementations of the present disclosure.
Figure 1B:
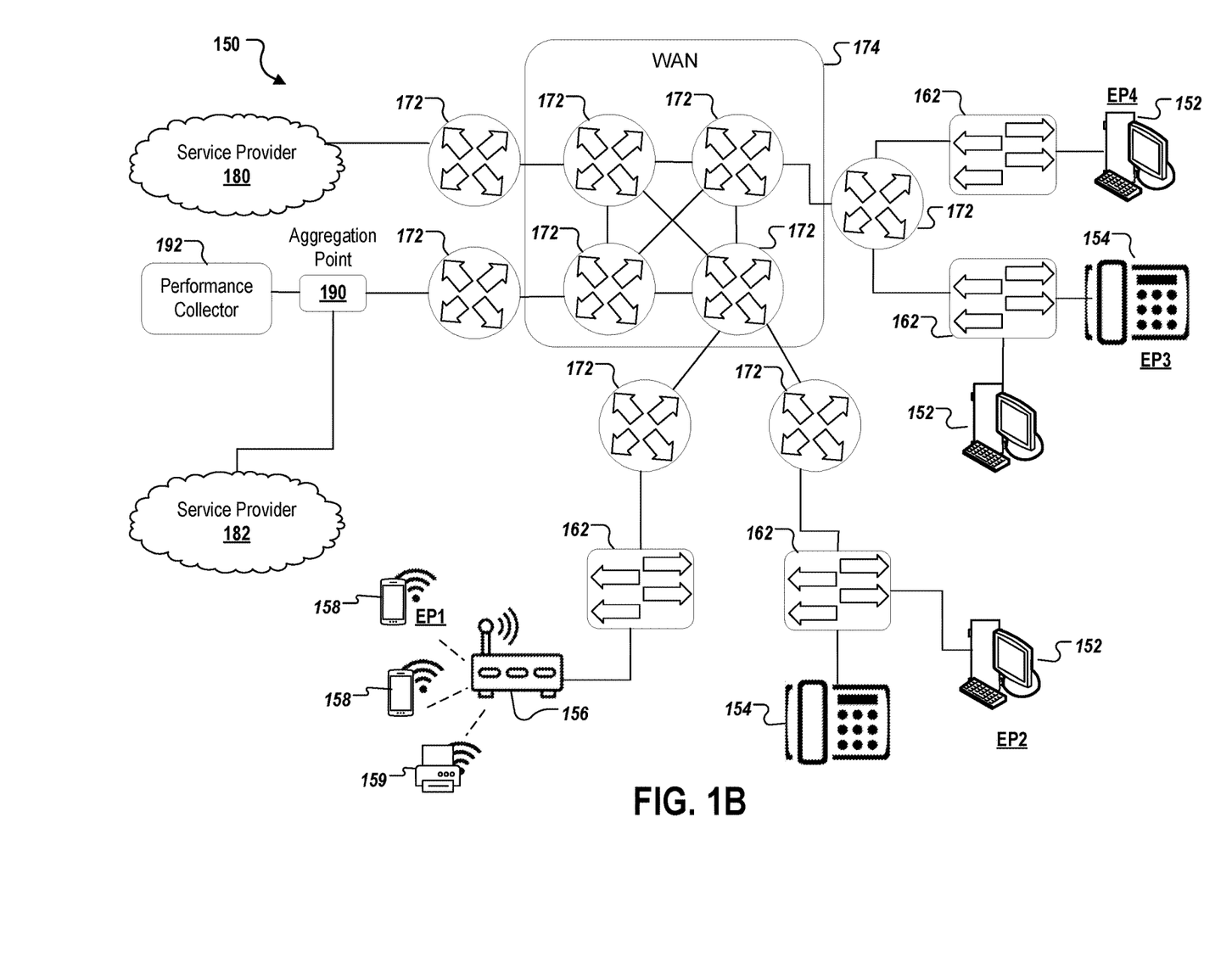

FIGS. 1A and 1B depict example environments 100 and 150 respectively. The example environments 100 and 150 can be employed to execute implementations of the present disclosure. The example environment 100 includes computing devices 102, 104, 106, 108, a back-end system 130, and a network 110. In some implementations, the network 110 includes a local area network (LAN), wide area network (WAN), the Internet, or a combination thereof, and connects web sites, devices (e.g., the computing devices 102, 104, 106, 108) and back-end systems (e.g., the back-end system 130). In some implementations, the network 110 can be accessed over a wired and/or a wireless communications link. For example, mobile computing devices (e.g., the smartphone device 102 and the tablet device 106), can use a cellular network to access the network 110. In some examples, the users 122-126 may be employees or agents working for an enterprise that provides a services through the example system 100.

The computing devices 102, 104, 106 may each include any appropriate type of computing device, such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, a printer, an IP phone, or an appropriate combination of any two or more of these devices or other data processing devices. In the depicted example, the computing device 102 is a smartphone, the computing device 104 is a desktop computing device, and the computing device 106 is a tablet-computing device.

The server computing device 108 may include any appropriate type of computing device, such as described above for computing devices 102-106 as well as computing devices with server-class hardware. In some implementations, the server computing device 108 may include computer systems using clustered computers and components to act as a single pool of seamless resources. It is contemplated, however, that implementations of the present disclosure can be realized with any of the appropriate computing devices, such as those mentioned previously.

In the depicted example, the back-end system 130 includes at least one server system 132 and a data store 134. In some implementations, the at least one server system 132 hosts one or more computer-implemented services that users 122-126 can interact with using the respective computing devices 102-106. For example, the computing devices 102-106 are used by respective users 122-126 to log into and interact with the back-end system 130 over the network 110.

In some implementations, back-end system 130 may include server-class hardware type devices. In some implementations, back-end system 130 includes computer systems using clustered computers and components to act as a single pool of seamless resources when accessed through the network 110. For example, such implementations may be used in data center, cloud computing, storage area network (SAN), and network attached storage (NAS) applications. In some implementations, back-end system 130 is deployed using a virtual machine(s).

As depicted in FIG. 1B, the example enviroment 150 includes elements that can be deployed as a network of an enterprise, such as a corporation. The example enviroment 150 includes computing devices 152, 154, 156, 158, and 159 employed by end users (not shown), such as end uses 122-126 of FIG. 1A. Computing devices 152-159 are substaintally similar to computing devices 102-106 of FIG. 1A, and are connected to level 2 (L2) devices 162. In the depicted example, computing devices 152 are desktop computers, computing devices 154 are office phones, computing device 156 is a wireless router, computing devices 158 are mobile phones, and computing device 159 is a printer. Such devices are depicted to provide examples of the types of devices that may be employed as end points in a network provided through the example enviroment 150.

In some implementations, L2 devices 162 operate at the second layers of the Open Systems Interconnection (OSI) model, the Data Link Layer, and include devices, such as bridges, switches, modems, network cards, and L2 Firewall devices. At the Data Link layer, each network device has an address known as the Media Access Control address (MAC), which may be hard-wired into the network device by the manufacturer. These L2 devices 162 are connected to layer 3 (L3) devices 172.

In some implementations, the L3 devices 172 operate at the third layer of the OSI model, the Network layer, and include devices, such as L3 gateways, routers, brouters, and 3-layer switches. The L3 devices are connected through the formed WAN 174. IT services provided through the depicted example enviroment 150, may be provide through servers, such as the back-end system 130 from FIG. 1A, which may be located where accessible to most of the end-users. For example, back-end systems may be located in a data center or provided through a Proxy or third-party service provider, such as service providers 180 and 182. Service providers 180 and 182 include third party or outsourced suppliers, such as telecommunications service providers (TSP), application service providers (ASPs), storage service providers (SSPs), and interne service providers (ISPs).

The computing devices 152-158 represent end-points in the network. Four end-points, EP1, EP2, EP3 and EP4, are depicted in FIG. 1B for examples purposes; however, a network may have many end-points. Each end-point may be assigned a distinct L3 addresses, such as an IP address. The end-points, EP1-4, may be using, for example, an IT service provided by service provider 180. In the depicted example 150, the boundaries of the service provider 180 are tapped at aggregation point 190 such that traffic to and from the service provider 180 is forwarded to a performance collector 192. Aggregation points can include taps and packet brokers where the taps obtain a copy of the traffic and feed the packet broker where this traffic is aggregated, filtered and forwarded to other device for performance analysis. In some implementations, the performance collector 192 includes an appliance or software that collects traffic or the metadata from a passive measure point on network. The performance collector 192 may analyze data back in time and actively calculate various performance metrics related to the traffic. For example, the performance collector 192 actively calculates the performance metrics related to each end-points. Such performance metrics may include, for example, the network response time for each end-point. In some implementations, the network response time is the time it takes for a transmission control protocol (TCP) connection to complete. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent.

In some implementations, a TCP connection is established though a three-way handshake using packets, units of data made that travels along a given network path. TCP's three-way handshaking technique is often referred to as "SYN-SYN-ACK" (or more accurately SYN, SYN-ACK, ACK, which stand for a synchronize packet, a synchronize-acknowledge packet, and an acknowledge respectively). These packets are three "messages" transmitted by TCP to negotiate and start a TCP session between two computers, such a computing devices 152-158. The TCP handshaking mechanism is designed so that two computers attempting to communicate can negotiate the parameters of the network TCP socket connection before transmitting data, such as secure shell (SSH) or hypertext transfer protocol (HTTP) web browser requests.

Figure 2:
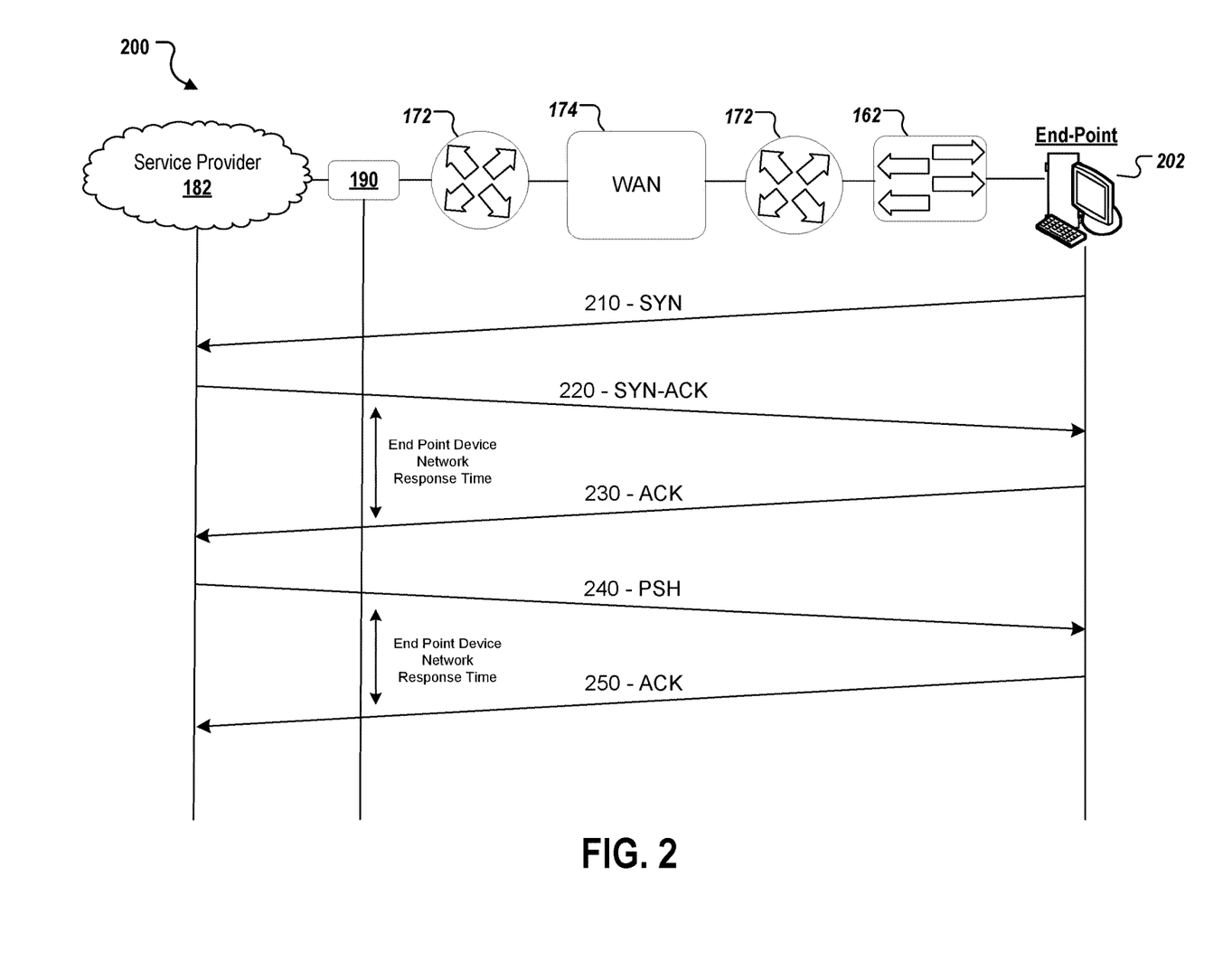
FIG. 2 depicts example data collected by a performance collector.

FIG. 2 depicts an example 200 of the data collected by a performance collector, such as performance collector 192 of FIG. 1B. The depicted example 200 includes end-point 202, which represents an end-point in the example enviroment 150, such as EP1-EP4. By way of example, the end-point 202 is depicted as sending and receiving TCP packets from the service provider 180 by way of various elements of the example enviroment 150. For simplicity, these elements are referred to below as "the network." At 210, the SYN packet is sent from end-point 202 to the service provider 180 through the network. The SYN packet requests a connection from the service provider 180. At 220, the service provider sends a SYN-ACK packet to the end-point 180 back through the network. The SYN-ACK packet acknowledges the SYN request. At 230, the end-point 202 then sends an ACK pack to the service provider 180, which acknowledges the SYN-ACK packet. The sending of the PSH (push) packet at 240, and the corresponding ACK packet a 250 sending of data from the service provider 180 and the acknowledgment of the receipt of the data by the end-point 202. As described previously for FIG. 1B, this information is tapped at aggregation point 190 and is forwarded to a performance collector 192. The time between the SYN-ACK packet(s) and the corresponding ACK packet(s) as well as the time between the PSH packet(s) and the corresponding ACK packet(s) is determined the performance collector 192 as the network response time for the end-point 202. These metrics are persisted by the performance collector 192. Moreover, whenever an end-point, such as end-point 202, is connected to the network, a location table may be updated.

Figure 3A:
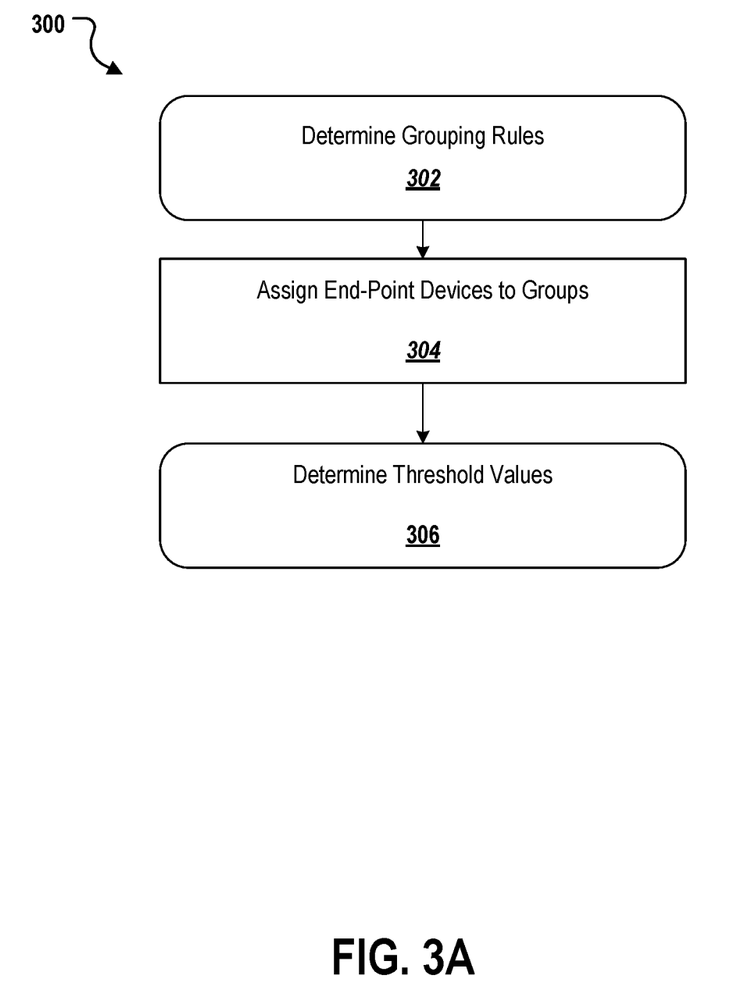
FIGS. 3A and 3B depict flow diagrams of an example processes that can be employed to identify performance issues on a network.
Figure 3B:
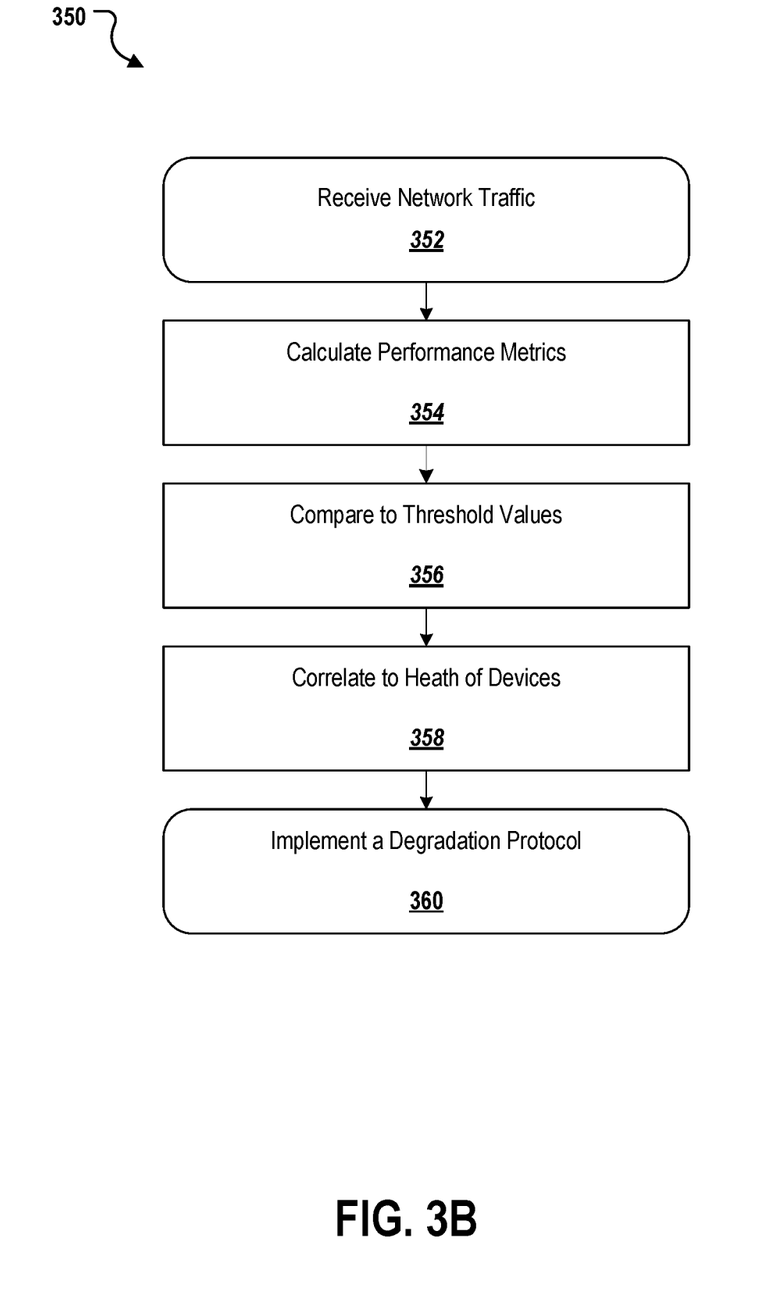

FIGS. 3A and 3B depict flow diagrams of example processes 300 and 350 respectively. The example processes 300 and 350 can be employed to identify performance issues on a network, such a network provided by the example environments 100 and 150 of FIGS. 1A and 1B respectively.

For clarity of presentation, the description that follows generally describes processes 300 and 350 in the context of FIGS. 1A, 1B, 2, and 4. However, it will be understood that processes 300 and 350 may be performed, for example, by any other suitable system, environment, software, and hardware, or a combination of systems, environments, software, and hardware as appropriate. In some implementations, various steps of the processes 300 and 350 can be run in parallel, in combination, in loops, or in any order.

For process 300, at 302, grouping rules for the end-point devices are determined. In some implementations, this grouping rules may be derived from the location table for each of the end-point devices. Examples of such groupings may include but are not limited to end-point devices that share the same access point (AP), channel, or any other property related to AP; end-point devices that share the same firewall or logical set of rules inside a firewall, end-point devices that are part of the same switch, switch/VLAN or any other properties related to the switch, end-point devices that part of the same gateway, gateway/VLAN or Gateway/VLAN/Sub-interface, shared operating systems, and end-point devices that are part of the same site or geographical area. From 302, the process 300 proceeds to 304.

Table 3 provides an example of end-point device groupings:

TABLE 3

| Group | Network Device | Interface/ Sub-Interface | Property 1 | Property 2 | Property N |
|---|---|---|---|---|---|
| Gr1 | S1 | P20 | Pr1 | Pr2 | ... |
| Gr2 | G1 | I1 | Pr3 | Pr4 | ... |
| Gr3 | G2 | I1 | Pr5 | Pr6 | ... |

At 304, the end-point device on the network are assigned to at least one group based on the grouping rules. For example, an end-point device may be grouped based on an access point, a switch, router, VLAN, interface, sub-interface, or other device through which it sends or receives data. From 304, the process 300 proceeds to 306.

Table 4 provide an example of end-point devices assigned to various groupings.

TABLE 4

| End-Device/Group | Group |
|---|---|
| IP1 | Gr1 |
| IP2 | Gr2 |
| IP1 | Gr3 |
| IP2 | Gr3 |
| IP1 | Gr4 |
| Gr1 | Gr3 |
| Gr2 | Gr3 |

At 306, a threshold values are determined for each of the groups and each end-point device based on historical performance data. A threshold, either for a group or end-point device may be static or dynamic. For example, a static value may remain fixed for each period that performance data is collected, while a dynamic value may be updated based on the collected performance data. Moreover, static or dynamic threshold can be employed to determine the degradation of the service. An example of a static threshold is the server response time exceeding a set value (e.g., one second) then the server can be characterized as degraded. Dynamic thresholds may be employed in, for example, comparisons between existing measurements with historical data. Such dynamic thresholds may this change over time with the behavior of the traffic. In some implementations, a dynamic threshold value is a baseline determined based on the historical data that is updated (e.g., recalculated) based on the performance data collected for each period. Statistical methodologies, such as standard-deviations, can be employed to determine the abnormality in the results based on the historical data. As an example, the average of historical data may be calculated and compared to a current response time. When the current response time is a set percentage (e.g., 100 percent) more than the past data a degradation may be flagged or triggered. From 306, the process 300 ends.

In some implementation, once the end-points have been grouped and the thresholds values calculated, example process 350 can be executed by a module, such as performance collected 192 of FIG. 1B, to analyzed collected performance data or each of the assigned groups and end-points on the network. In some implementations, the performance data is collected periodically based on, for example, a time interval or a data throughput interval. In some implementation, the performance collector measures, for example, the performance metrics of the traffic feed over a set time interval (e.g., every second or every minute).

At 352, network traffic data (e.g., packet data) to and from end-point devices on a network is received for an interval. For example, as described previously regarding example environment 150, traffic that passes through an aggregation point, such as aggregation point 190, can be received by a performance collector, such as performance collected 192. In some implementations, the end-point devices are part of a sub-portion of the network. In some implementations, the interval period is time based. For example, the performance data is collected for a set amount of seconds. In some implementation, the interval throughput based. For example, the performance data is collected for a set number of bytes of data. From 352, the process 340 proceeds to 354.

At 354, performance metrics are calculated for each of the groups and end-point devices based on the performance data for the period. The calculation can be done using any appropriate formula (Average, Max Value, Minimum Value, and so forth). From 354, the process 350 proceeds to 356.

Table 5 provides an example of various metrics collected for end-point devices assigned to various groupings for a period.

TABLE 5

| Group | Collection Timeframe | Metric1 | Metric2 | MetricN |
|---|---|---|---|---|
| Gr1 | T1-T2 | Gr1_T1_M1 | Gr1_T1_M2 | ... |
| Gr2 | T1-T2 | Gr2_T1_M1 | Gr2_T1_M2 | ... |
| Gr3 | T1-T2 | Gr3_T1_M1 | Gr3_T1_M2 | ... |
| Gr1 | T2-T3 | Gr1_T2_M1 | Gr1_T2_M2 | ... |
| Gr2 | T2-T3 | Gr2_T2_M1 | Gr2_T2_M2 | ... |
| Gr3 | T2-T3 | Gr3_T2_M1 | Gr3_T2_M2 | ... |

At 356, the determined metrics for the groups and each of the end-point devices are compared to respective threshold values determined based on historical performance data (See step 306 of FIG. 3A). In some implementations, when a threshold is exceeded for an end-point device(s), then the groups that include the end-point device(s) are identified. When the threshold is exceeded for specific group(s), then a primary contributor group can be identify within the list based on, for example, the deviation of the group from an historical baseline. For example, a group may include end-devices connected to a gateway. Such a group, may also include other sub-groups that are related to the switches connected to the gateway. Should one of these switches degrade, the measurements may show that the gateway is affected because of the degraded sub-group switch as it may be contributing to the overall response to the main group. From the group rule table, the issue can be identified based on the interfaces and properties specific to this group. As another example, when only an end-device's threshold is exceeded, then the issue may be related to this end-device only. For example, using a tree structure where the leaves are the end-device performance, small branches are L2 switches performance, larger branches are L3 routers performance, and so forth, when any branch is affected, the described system may be employed to dive deep into the small branches under the affected branch to identify the issue, or when the smallest branch is affected, the respective end-device(s) can be identified. From 356, the process 350 proceeds to 358.

At 358, the identified performance issue is correlated with the health of the device, interface, or properties related to the end-point device. For example, when a particular firewall group is affected, then health data (e.g., availability, faults, alarms, and so forth) related to this device can be reviewed. From 358, the process 350 proceeds to 360.

At 360, a degradation protocol is implemented. Such a protocol can include implementing an action to correct the determined performance issues for the network based on the aspect of the at least one end-point devices. The action may include, for example, providing an alarm identifying the exact location of the network where the issue occurred to a monitoring center. From 360, the process 350 ends.

Figure 4:
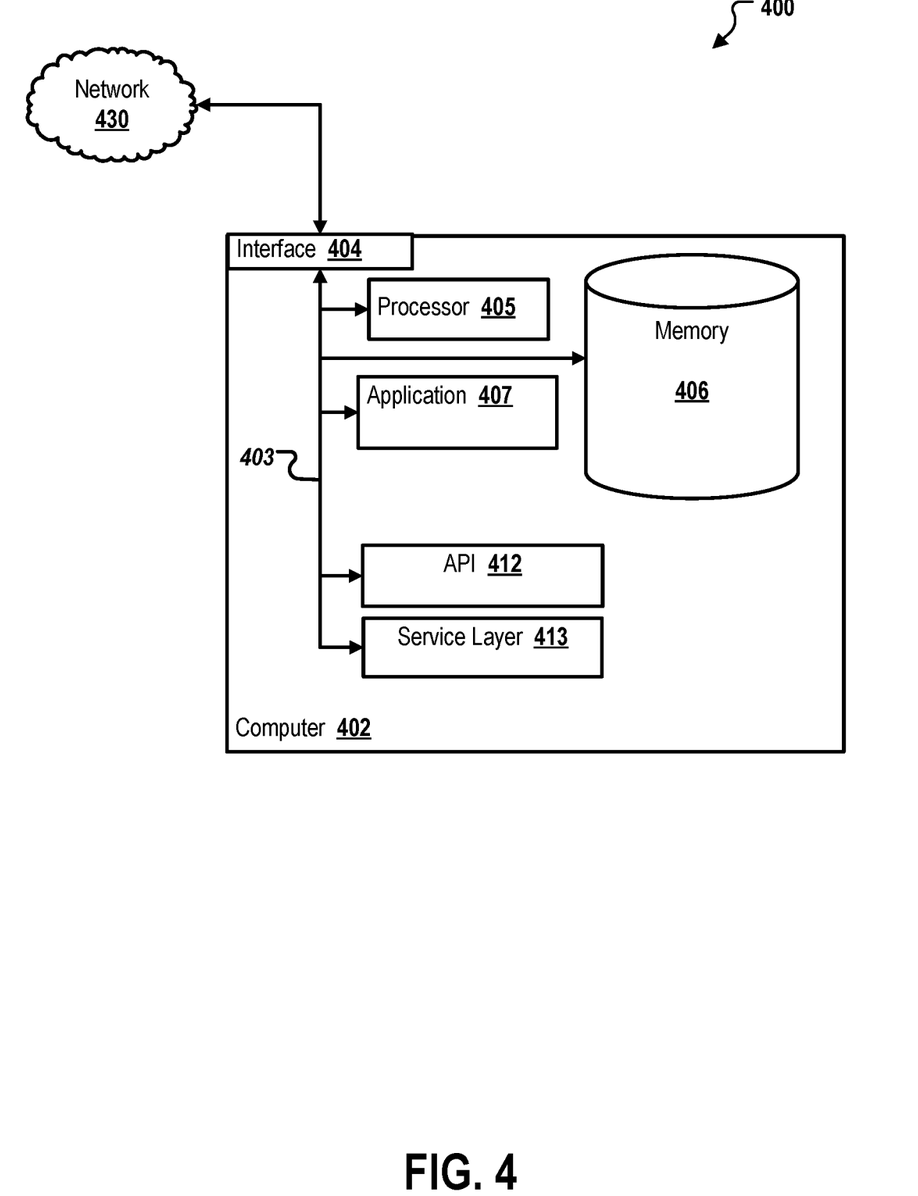
FIG. 4 illustrates a block diagram of an exemplary computer system used to provide computational functionalities associated with described algorithms, methods, functions, processes, flows, and procedures as described in the instant disclosure, according to an implementation.

FIG. 4 depicts a block diagram of a computer system 400 used to provide computational functionalities associated with described algorithms, methods, functions, processes, flows, and procedures as described in the instant disclosure, according to an implementation. The illustrated computer 402 is intended to encompass any computing device such as a server, desktop computer, laptop or notebook computer, wireless data port, smart phone, personal data assistant (PDA), tablet computing device, one or more processors within these devices, or any other suitable processing device, including both physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, business intelligence (BI) server, or other server (or a combination of servers).

The computer 402 can receive requests over network 430 from a client application (for example, executing on another computer 402) and responding to the received requests by processing the said requests in an appropriate software application. In addition, requests may also be sent to the computer 402 from internal users (for example, from a command console or by other appropriate access method), external or third parties, other automated applications, as well as any other appropriate entities, individuals, systems, or computers.

Each of the components of the computer 402 can communicate using a system bus 403. In some implementations, any or all of the components of the computer 402, both hardware or software (or a combination of hardware and software), may interface with each other or the interface 404 (or a combination of both) over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems in a distributed environment that are connected to the network 430 (whether illustrated or not). Generally, the interface 404 comprises logic encoded in software or hardware (or a combination of software and hardware) and operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a memory 406 that holds data for the computer 402 or other components (or a combination of both) that can be connected to the network 430 (whether illustrated or not). For example, memory 406 can be a database storing data consistent with this disclosure. Although illustrated as a single memory 406 in FIG. 4, two or more memories may be used according to particular needs, desires, or particular implementations of the computer 402 and the described functionality. While memory 406 is illustrated as an integral component of the computer 402, in alternative implementations, memory 406 can be external to the computer 402.

The application 407 is an algorithmic software engine providing functionality according to particular needs, desires, or particular implementations of the computer 402, particularly with respect to functionality described in this disclosure. For example, application 407 can serve as one or more components, modules, applications, etc. Further, although illustrated as a single application 407, the application 407 may be implemented as multiple applications 407 on the computer 402. In addition, although illustrated as integral to the computer 402, in alternative implementations, the application 407 can be external to the computer 402.

There may be any number of computers 402 associated with, or external to, a computer system containing computer 402, each computer 402 communicating over network 430. Further, the term "client," "user," and other appropriate terminology may be used interchangeably as appropriate without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a computer-implemented method executed by one or more processors, includes receiving network traffic data from an aggregation point on a network, the network traffic data having been sent to or received from one of a plurality of end-point devices on the network; calculating performance metrics for each of the end-point devices based the received network traffic data; for each of the end-point devices, comparing the performance metrics to respective threshold values to determine performance issues for the network, wherein the threshold values are determined based on historical network data collected for the respective end-point device; correlating the determined performance issues for the network to an aspect of at least one of the end-point devices; and implementing an action to correct the determined performance issues for the network based on the aspect of the at least one end-point devices.

The foregoing and other described implementations can each optionally include one or more of the following features.

A first feature, combinable with any of the following features, the end-point devices are grouped into groups based on grouping rules.

A second feature, combinable with any of the following features, the grouping rules are derived from a location of the end-point devices.

A third feature, combinable with any of the following features, the grouping rules include groupings based on shared access points or channels, shared firewalls or logical set of rules inside a firewall, shared switches or virtual local area network, shared gateways, shared operating systems, or a same site or geographical area.

A fourth feature, combinable with any of the following features, the computer-implemented method includes calculating group performance metrics for each of the groups based the received network traffic data; wherein the performance issues for the network are determined by comparing the group performance metrics to respective group threshold values, wherein the group threshold values are determined based on the historical network data collected for the respective end-point devices within each of the groups.

A fifth feature, combinable with any of the following features, the action includes providing an alarm to a monitoring center, the alarm identifying a location of the network where the performance issues occurred.

A sixth feature, combinable with any of the following features, the aspect comprise a performance, an interface, or a property of the at least one of the end-point devices.

A seventh feature, combinable with any of the following features, the end-point devices include a desktop computer, an office phone, a wireless router, a printer, or a mobile computing device.

An eighth feature, combinable with any of the following features, the performance metrics are calculated for an interval.

A ninth feature, combinable with any of the following features, the interval is a time-based interval.

A tenth feature, combinable with any of the following features, the interval is a throughput-based interval.

In a second implementation, one or more non-transitory computer-readable storage media are coupled to one or more processors. Instructions are stored on the one or more non-transitory computer-readable storage media that when executed by the one or more processors, cause the one or more processors to perform operations. These operations include receiving network traffic data from an aggregation point on a network, the network traffic data having been sent to or received from one of a plurality of end-point devices on the network; calculating performance metrics for each of the end-point devices based the received network traffic data; for each of the end-point devices, comparing the performance metrics to respective threshold values to determine performance issues for the network, wherein the threshold values are determined based on historical network data collected for the respective end-point device; correlating the determined performance issues for the network to an aspect of at least one of the end-point devices; and implementing an action to correct the determined performance issues for the network based on the aspect of the at least one end-point devices.

The foregoing and other described implementations can each optionally include one or more of the following features.

A first feature, combinable with any of the following features, the end-point devices are grouped into groups based on grouping rules.

A second feature, combinable with any of the following features, the grouping rules are derived from a location of the end-point devices.

A third feature, combinable with any of the following features, the grouping rules include groupings based on shared access points or channels, shared firewalls or logical set of rules inside a firewall, shared switches or virtual local area network, shared gateways, shared operating systems, or a same site or geographical area.

A fourth feature, combinable with any of the following features, the operations include calculating group performance metrics for each of the groups based the received network traffic data; wherein the performance issues for the network are determined by comparing the group performance metrics to respective group threshold values, wherein the group threshold values are determined based on the historical network data collected for the respective end-point devices within each of the groups.

A fifth feature, combinable with any of the following features, the action includes providing an alarm to a monitoring center, the alarm identifying a location of the network where the performance issues occurred.

A sixth feature, combinable with any of the following features, the aspect comprise a performance, an interface, or a property of the at least one of the end-point devices.

A seventh feature, combinable with any of the following features, the end-point devices include a desktop computer, an office phone, a wireless router, a printer, or a mobile computing device.

An eighth feature, combinable with any of the following features, the performance metrics are calculated for an interval.

A ninth feature, combinable with any of the following features, the interval is a time-based interval.

A tenth feature, combinable with any of the following features, the interval is a throughput-based interval.

In a third implementation, a system includes one or more processors and a computer-readable storage device coupled to the one or more processors. The computer-readable storage device having instructions stored thereon which, when executed by the one or more processors, cause the one or more processors to perform operations. These operations include receiving network traffic data from an aggregation point on a network, the network traffic data having been sent to or received from one of a plurality of end-point devices on the network; calculating performance metrics for each of the end-point devices based the received network traffic data; for each of the end-point devices, comparing the performance metrics to respective threshold values to determine performance issues for the network, wherein the threshold values are determined based on historical network data collected for the respective end-point device; correlating the determined performance issues for the network to an aspect of at least one of the end-point devices; and implementing an action to correct the determined performance issues for the network based on the aspect of the at least one end-point devices.

The foregoing and other described implementations can each optionally include one or more of the following features.

A first feature, combinable with any of the following features, the end-point devices are grouped into groups based on grouping rules.

A second feature, combinable with any of the following features, the grouping rules are derived from a location of the end-point devices.

A third feature, combinable with any of the following features, the grouping rules include groupings based on shared access points or channels, shared firewalls or logical set of rules inside a firewall, shared switches or virtual local area network, shared gateways, shared operating systems, or a same site or geographical area.

A fourth feature, combinable with any of the following features, the operations include calculating group performance metrics for each of the groups based the received network traffic data; wherein the performance issues for the network are determined by comparing the group performance metrics to respective group threshold values, wherein the group threshold values are determined based on the historical network data collected for the respective end-point devices within each of the groups.

A fifth feature, combinable with any of the following features, the action includes providing an alarm to a monitoring center, the alarm identifying a location of the network where the performance issues occurred.

A sixth feature, combinable with any of the following features, the aspect comprise a performance, an interface, or a property of the at least one of the end-point devices.

A seventh feature, combinable with any of the following features, the end-point devices include a desktop computer, an office phone, a wireless router, a printer, or a mobile computing device.

An eighth feature, combinable with any of the following features, the performance metrics are calculated for an interval.

A ninth feature, combinable with any of the following features, the interval is a time-based interval.

A tenth feature, combinable with any of the following features, the interval is a throughput-based interval.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an field programmable gate array (FPGA), or an application-specific integrated circuit (ASIC). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and compact disc read-only memory (CD-ROM), Digital Versatile Disc (DVD)+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a cathode ray tube (CRT), liquid crystal display (LCD), Light Emitting Diode (LED), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term GUI may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a LAN, a radio access network (RAN), a metropolitan area network (MAN), a WAN, Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware or software (or a combination of hardware and software), may interface with each other or the interface using an API or a service layer (or a combination of API and service layer). The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in XML format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described earlier as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described earlier should not be understood as requiring such separation or integration in all implementations, and it should be understood that the described program components and systems can generally be integrated together in a single software product or packaged into multiple software products.

Accordingly, the earlier description of example implementations does not define or constrain this disclosure. Other changes, substitutions, and alterations are also possible without departing from the spirit and scope of this disclosure.

Furthermore, any claimed implementation described later is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

The invention claimed is:

1. A computer-implemented method executed by one or more processors, the method comprising:
    receiving network traffic data from an aggregation point on a network, the network traffic data having been sent to or received from one of a plurality of end-point devices on the network;
    calculating performance metrics for each of the end-point devices based on the received network traffic data;
    for each of the end-point devices, comparing the performance metrics to respective threshold values to determine performance issues for the network, wherein the threshold values are determined based on historical network data collected for the respective end-point device;
    correlating the determined performance issues for the network to an aspect of at least one of the end-point devices, wherein the aspect comprises at least one of a performance, an interface, or a property of the at least one of the end-point devices; and
    implementing an action to correct the determined performance issues for the network based on the aspect of the at least one end-point devices.

2. The method of claim 1, wherein the end-point devices are grouped into groups based on grouping rules.

3. The method of claim 2, wherein the grouping rules are derived from a location of the end-point devices.

4. The method of claim 2, wherein the grouping rules include groupings based on shared access points or channels, shared firewalls or logical set of rules inside a firewall, shared switches or virtual local area network, shared gateways, shared operating systems, or a same site or geographical area.

5. The method of claim 2, comprising:
    calculating group performance metrics for each of the groups based the received network traffic data; wherein the performance issues for the network are determined by comparing the group performance metrics to respective group threshold values, wherein the group threshold values are determined based on the historical network data collected for the respective end-point devices within each of the groups.

6. The method of claim 1, wherein the action includes providing an alarm to a monitoring center, the alarm identifying a location of the network where the performance issues occurred.

7. The method of claim 1, wherein the end-point devices include a desktop computer, an office phone, a wireless router, a printer, or a mobile computing device.

8. The method of claim 1, wherein the performance metrics are calculated for an interval.

9. The method of claim 8, wherein the interval is a throughput-based interval.

10. The method of claim 8, wherein the interval is a time-based interval.

11. One or more non-transitory computer-readable storage media coupled to one or more processors and having instructions stored thereon which, when executed by the one or more processors, cause the one or more processors to perform operations comprising:
receiving network traffic data from an aggregation point on a network, the network traffic data having been sent to or received from one of a plurality of end-point devices on the network;
calculating performance metrics for each of the end-point devices based on the received network traffic data;
for each of the end-point devices, comparing the performance metrics to respective threshold values to determine performance issues for the network, wherein the threshold values are determined based on historical network data collected for the respective end-point device;
correlating the determined performance issues for the network to an aspect of at least one of the end-point devices, wherein the aspect comprises at least one of a performance, an interface, or a property of the at least one of the end-point devices; and
implementing an action to correct the determined performance issues for the network based on the aspect of the at least one end-point devices.

12. The one or more non-transitory computer-readable storage media of claim 11, wherein the end-point devices are grouped into groups based on grouping rules.

13. The one or more non-transitory computer-readable storage media of claim 12, wherein the operations comprise:
calculating group performance metrics for each of the groups based the received network traffic data; wherein the performance issues for the network are determined by comparing the group performance metrics to respective group threshold values, wherein the group threshold values are determined based on the historical network data collected for the respective end-point devices within each of the groups.

14. The one or more non-transitory computer-readable storage media of claim 12, wherein the grouping rules are derived from a location of the end-point devices.

15. The one or more non-transitory computer-readable storage media of claim 12, wherein the grouping rules include groupings based on shared access points or channels, shared firewalls or logical set of rules inside a firewall, shared switches or virtual local area network, shared gateways, shared operating systems, or a same site or geographical area.

16. A computer-implemented system, comprising:
one or more processors; and
a computer-readable storage device coupled to the one or more processors and having instructions stored thereon which, when executed by the one or more processors, cause the one or more processors to perform operations comprising:
receiving network traffic data from an aggregation point on a network, the network traffic data having been sent to or received from one of a plurality of end-point devices on the network;
calculating performance metrics for each of the end-point devices based on the received network traffic data;
for each of the end-point devices, comparing the performance metrics to respective threshold values to determine performance issues for the network, wherein the threshold values are determined based on historical network data collected for the respective end-point device;
correlating the determined performance issues for the network to an aspect of at least one of the end-point devices, wherein the aspect comprises at least one of a performance, an interface, or a property of the at least one of the end-point devices; and
implementing an action to correct the determined performance issues for the network based on the aspect of the at least one end-point devices.

17. The computer-implemented system of claim 16, wherein the performance metrics are calculated for an interval, and wherein the interval is a time-based interval or a throughput-based interval.

18. The computer-implemented system of claim 16, wherein the action includes providing an alarm to a monitoring center, the alarm identifying a location of the network where the performance issues occurred.

19. The computer-implemented system of claim 16, wherein the aspect comprise a performance, an interface, or a property of the at least one of the end-point devices.

* * * * *

UNITED STATES PATENT AND TRADEMARK OFFICE
CERTIFICATE OF CORRECTION

PATENT NO. : 10,862,781 B2  
APPLICATION NO. : 16/182935  
DATED : December 8, 2020  
INVENTOR(S) : Baher Y. Al Ramady et al.

Page 1 of 1

It is certified that error appears in the above-identified patent and that said Letters Patent is hereby corrected as shown below:

On the Title Page

Column 1, Item (72) Inventors, please replace "Baher Y. Al Ramady, Damman (SA)" with -- Baher Y. Al Ramady, Dammam (SA) --

Column 2, Item (57) Abstract, Line 9, after "based" insert -- on --

In the Claims

Column 18, Line 57, Claim 5, after "based" insert -- on --

Column 19, Line 41, Claim 13, after "based" insert -- on --

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*